United States Patent
Liao (10) Patent No.: US 6,375,109 B1
(45) Date of Patent: Apr. 23, 2002

(54) WIRE WINDING BOX FOR SHORT DISTANCE USE

(76) Inventor: Sheng-Hsin Liao, No. 10, Alley 38, Lane 229, Sun Chun St., Shu Lin, Taipei Hsien (TW)

( * ) Notice: Subject to any disclaimer, the term of this patent is extended or adjusted under 35 U.S.C. 154(b) by 0 days.

(21) Appl. No.: 09/515,211

(22) Filed: Feb. 29, 2000

(51) Int. Cl.[7] .............................................. B65H 75/48
(52) U.S. Cl. .................................. 242/378; 242/378.4
(58) Field of Search ........................... 242/378, 378.4, 242/378.1, 378.2, 378.3, 385.3

(56) References Cited

U.S. PATENT DOCUMENTS

| | | | | |
|---|---|---|---|---|
| 1,868,409 A | * | 7/1932 | Crispen .................... | 242/378.2 |
| 2,206,352 A | * | 7/1940 | Hellmann ................ | 242/378.2 |
| 2,629,630 A | * | 2/1953 | Roark .................... | 137/355.17 |
| 2,926,865 A | * | 3/1960 | Humphreys .............. | 242/378.3 |
| 3,412,951 A | * | 11/1968 | Ober ......................... | 242/388 |
| 3,545,693 A | * | 12/1970 | Gurner et al. ........... | 242/388.6 |
| 3,657,491 A | * | 4/1972 | Ryder et al. ............ | 191/12.2 R |
| 4,162,009 A | * | 7/1979 | Schouten ................. | 206/389 |
| 4,384,688 A | * | 5/1983 | Smith ..................... | 242/107.7 |
| 5,114,091 A | * | 5/1992 | Peterson et al. ......... | 242/378.3 |
| 5,332,171 A | * | 7/1994 | Steff ........................ | 242/378 |
| 5,361,612 A | * | 11/1994 | Voiculescu et al. ........... | 70/241 |
| 5,544,836 A | * | 8/1996 | Pera ........................... | 242/372 |
| 5,735,480 A | * | 4/1998 | Arai et al. ................... | 242/378 |
| 6,019,304 A | * | 2/2000 | Skowronski et al. ........ | 242/373 |
| 6,199,784 B1 | * | 3/2001 | Wang et al. ................ | 242/378 |
| 6,254,025 B1 | * | 7/2001 | Liao ....................... | 242/378.1 |
| 6,305,632 B1 | * | 10/2001 | Hwang .................... | 242/378.1 |

* cited by examiner

Primary Examiner—Donald P. Walsh
Assistant Examiner—Daniel K. Schlak
(74) Attorney, Agent, or Firm—Rosenberg, Klein & Lee (57) ABSTRACT

A wire winding box for short distance use is provided that includes a case with single receiving tank or two receiving tanks having a rotary disk rotatably installed therein which is driven by a spiral spring. A communication wire passes through a pivotal shaft for engaging with the rotary disk, then is bent through a proper angle, then is pulled to a ring of the rotary disk, and then is pulled out through the line outlet or is wound. As the rotary disk rotates, the wire will be wound around the ring and around the pivotal shaft to be pulled out or rewound rapidly. Additionally, a swingable piece and a ratchet wheel are partially overlapped and are pivotally installed in the receiving tank adjacent the rotary disk. Accordingly, through the regular action of alternatively pulling and releasing the communication wire can be easily positioned and rewound.

5 Claims, 10 Drawing Sheets

WIRE WINDING BOX FOR SHORT DISTANCE USE

FIELD OF THE INVENTION

The present invention relates to a wire winding box, and especially to a wire winding box for short distance use, which can be used with various wired communication devices. The communication wire in the wire winding box can be pulled out freely and can be rewound for preventing tangling thereof.

BACKGROUND OF THE INVENTION

The current computers, modems, telephones, fax machines and other communication devices are necessary to be arranged with proper communication wires for connection, in order to avoid overly long communication wires from tangling with one another. The inventor of the present invention has invented various wire winding boxes, such as found in U.S. Pat. Nos. 6,199,674, 6,056,591, 6,257,382, 6,254,025. Wherein, most of the wire winding boxes include a case, a rotary disk, a spiral spring and a communication wire. The spiral spring is firmly secured to the rotary disk, so that the communication wire winding on the rotary disk has the functions of unwinding and winding. Since the communication wire necessarily must retain an electric connection as it is pulled out or rewound, the wire winding box is installed with conductive devices of various types. For example, a plurality of conductive rings which are concentric, but have different diameters, are installed on the surface of the rotary disk, and another rotary disk or the case is installed with a plurality of conductive elastic pieces or steel pieces on conductive ring. As the rotary disk rotates, the electric connection in the communication wire cannot be effectively maintained. Further, since the conductive structure formed by the conductive elastic pieces, conductive rings, steel balls, etc. represent many components of very small size, it is very difficult to assemble them. In use, a bad contact easily occurs, so that the life of the product is short.

Besides, in the conventional wire winding box, as the communication wire is pulled out, it is possible that the communication wire is under high tension due to the large elastic force of a spiral spring, so that the wire cannot retain a proper and fixed unwound length. This is a big problem to the user.

In the Applicant's prior Patents, identified previously, a swingable piece is matched with notches or buckling grooves at the periphery of a rotary disk for rewinding or positioning the communication wire. However, in these structures, the winding positioning and length of the communication wire cannot be precisely controlled or predicted. Therefore, the user may pull out and release the communication wire many times. Although the functionality of the wire winding box is not reduced, the user does experience some problems.

SUMMARY OF THE INVENTION

Accordingly, the primary object of the present invention is to provide a wire winding box for short distance use, where the components can be reduced in number so that it can be assembled rapidly and conveniently by mass production techniques.

Another object fo the present invention is to provide a wire winding box for short distance use having a case with a single receiving tank or two receiving tanks in which a rotary disk which is driven by a spiral spring is pivotally installed. A communication wire first passes through a pivotal shaft for engaging with the rotary disk, then is bent through a predetermined angle of 90 degrees, then the wire is pulled to a ring of the rotary disk, and then it is pulled out from the line outlet or is wound. Therefore, as the rotary disk rotates, the wire will wind around the ring and then winds around the pivotal shaft and the ring to be pulled out or rewound rapidly. Thus, no conductive device is required to be placed in the wire winding box. The manufacturing process can be reduced greatly for mass production.

Another object of the present invention is to provide a wire winding box for short distance use, wherein through the regular action of alternaitvely pulling and releasing, the wire can be positioned and rewound, and the user may clearly know the action fo the wire. Therefore, the present invention can be used easily and conveniently.

A further objection of the present invention is to provide a wire winding box for short distance use, where a swingable piece and a ratchet wheel are overlapped partially and can swing freely, are pivotally installed in the receiving tank adjacent the rotary disk. As the rotary disk rotates, the swingable piece will control the rotation of the rotary disk.

The various objects and advantages of the present invention will be more readily understood from the following detailed description when read in conjunction with the appended drawings.

DETAILED DESCRIPTION OF THE PREFERRED EMBODIMENTS

Figure 1:
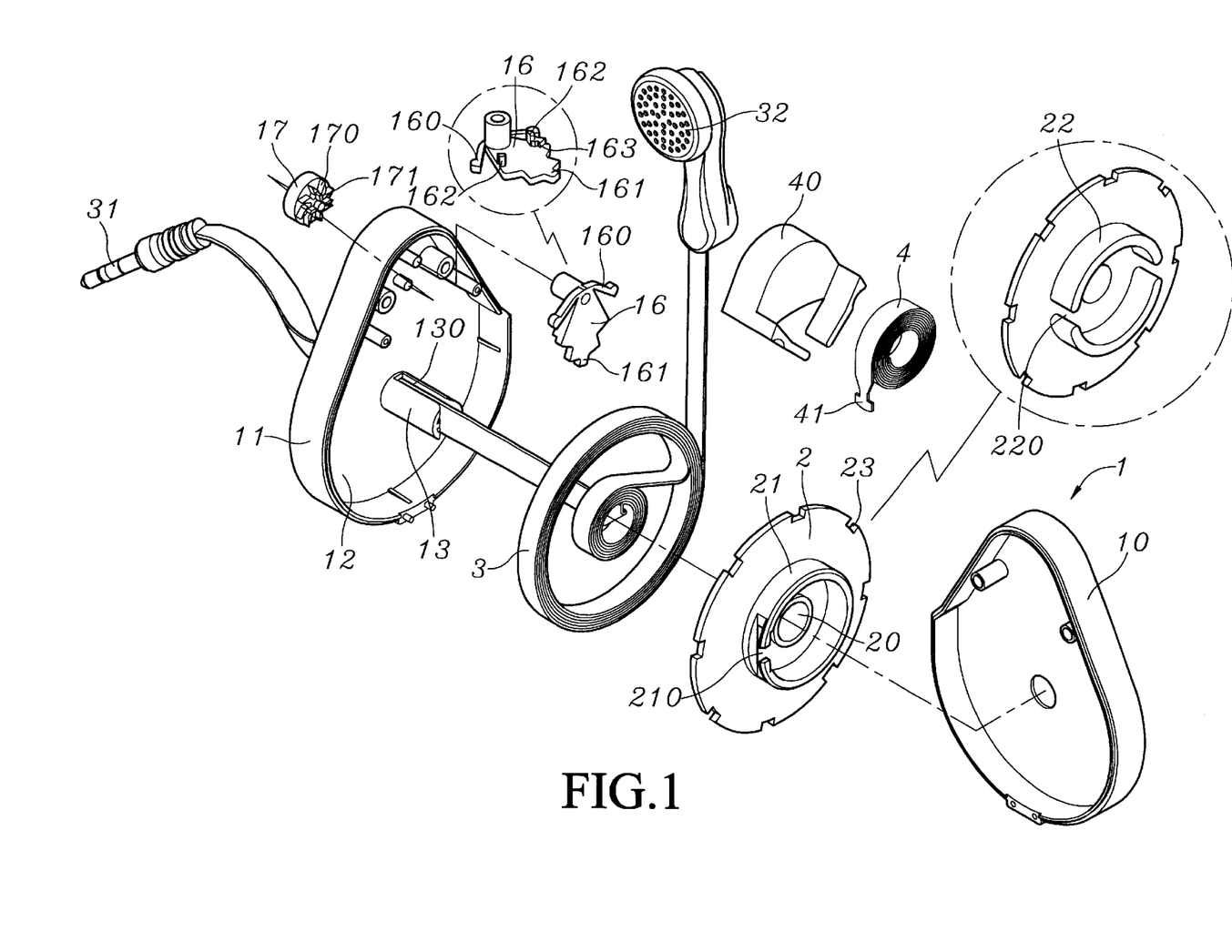
FIG. 1 is an exploded perspective view showing an embodiment of the present invention which is formed with a single receiving tank.

With reference to FIG. 1, a perspective view showing an embodiment of a wire winding box for short distance use is illustrated, wherein the wire winding box is formed by a single body. The wire winding box of the present invention includes a case 1, a rotary disk 2, a communication wire 3, and a spiral spring 4.

The case 1 is formed by combining a first half case 10 and a second half case 11 which form a single receiving tank 12. A pivotal shaft 13 is installed in the receiving tank 12. The pivotal shaft 13 and one lateral side of the case 1 are formed with line outlets 130 and 120, respectively. A rotary disk 2 is further installed in the receiving tank 12. The rotary disk 2 has a pivot hole 20. The rotary disk is pivotally engaged by the pivot hole for rotation. Two sides of the rotary disk adjacent the pivot hole are respectively installed with a first ring 21 and a second ring 22. The first ring 21 is installed with a hooking slot 210 for receiving an end hook 41 of the spiral spring 4 on the seat 40 outside of the rotary disk 2, to provide an elastic restoring force for the rotation of the rotary disk 2. The second ring 22 is installed with a slot 220. One end of the communication wire 3 passes through the line outlet 130 of the pivotal shaft 13, while the other end is firstly bent through an angle of 90 degrees, then is passed through the slot 220 of the second ring 22, and then protrudes from the line outlet 120 of the case 1. After the rotary disk 2 rotates, the communication wire 3 winds no the pivotal shaft 13 and the second ring 22 and then the hook 41 of the spiral spring 4 is hooked in the hook slot 210.

Figure 2:
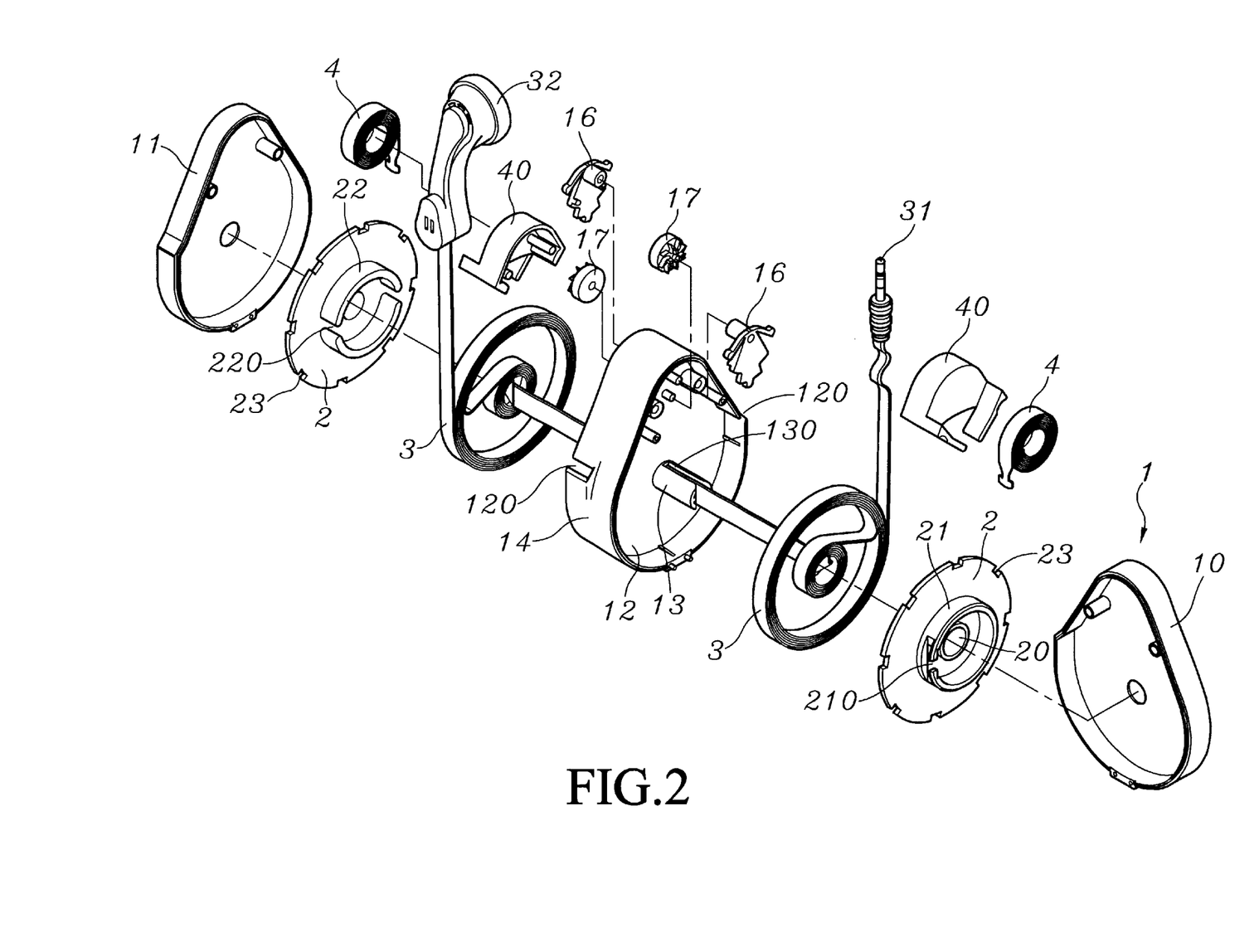
FIG. 2 is an exploded perspective view showing an embodiment of the present invention which is formed with two receiving tanks.
Figure 3:
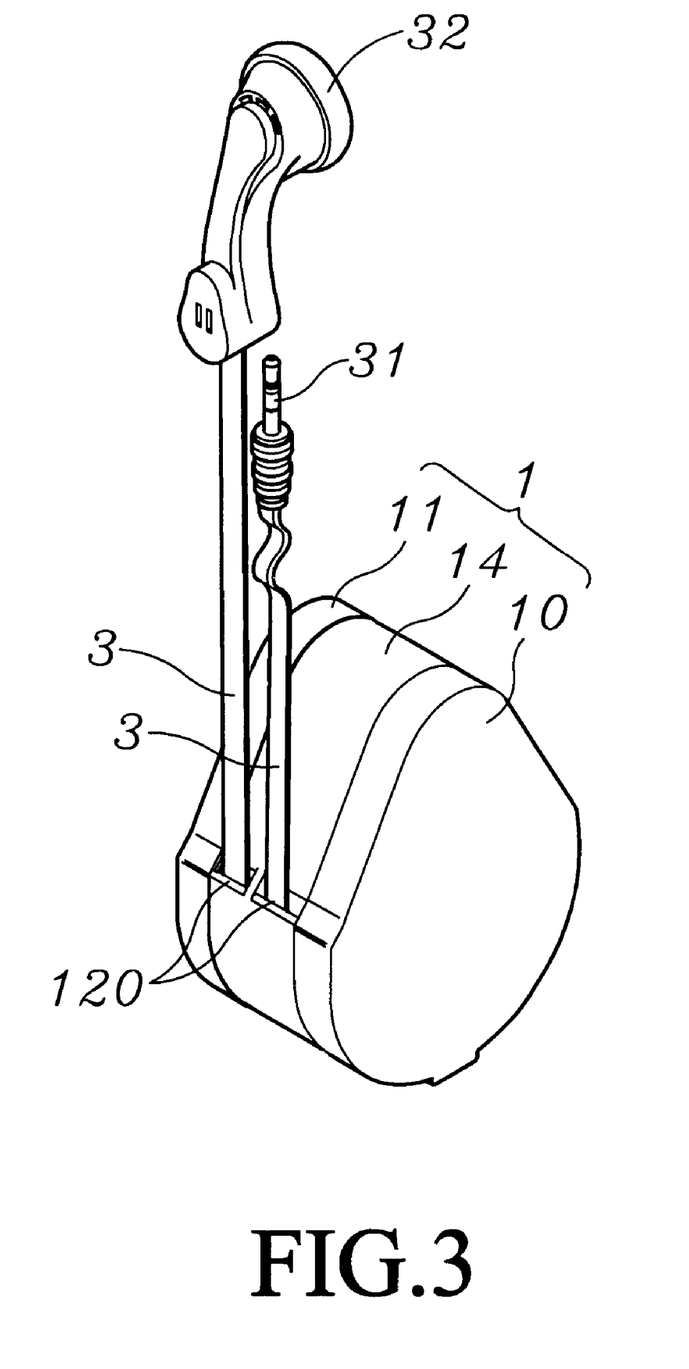
FIG. 3 is a perspective view showing the present invention with two bodies, and two wire ends of a communication wire protruding out from line outlets from the same side of the case.

As shown in FIG. 2, an exploded perspective view showing another embodiment of a wire winding box for short distance use is illustrated, wherein the wire winding box is formed by two bodies. The basic structure of the present invention is identical to that in the first embodiment, except that the case 1 is formed by a first half case 10 and a second half case 11 which are placed at two sides of a central seat 14, to form two receiving tanks 12. Each receiving tank 12 is arranged with a respective rotary disk 2 and a respective spiral spring 4. A single communication wire 3 passes through the line outlet 130 of the pivotal shaft 13 of the central seat 14, then is bent through an angle of 90 degrees, and then is pulled out from the second ring 22 of the rotary disk 2. Then, it is pulled out from the line outlet 120 for use. In the rotary disk 2, the communication wire winds on the pivotal shaft 13 and second ring 22 and the rotary disk 2 is hooked to the spiral spring 4. The two line outlets 120 in the case 1 can be arranged on the same side of the case, as shown in FIGS. 4 and 5, for providing different pulling directions.

Despite the depictions of the aforesaid wire winding box of single or double bodies, the two terminals of the communication wire 3 can be assembled with any desired type of plug. For example, the telephone plug 30 shown in FIG. 5, an RJ-45 network plug, the sound source plugs 31 shown in FIGS. 1 to 4, or an earphone, such as the hand free earphone 32 with microphone shown in FIGS. 1 to 4.

Figure 6:
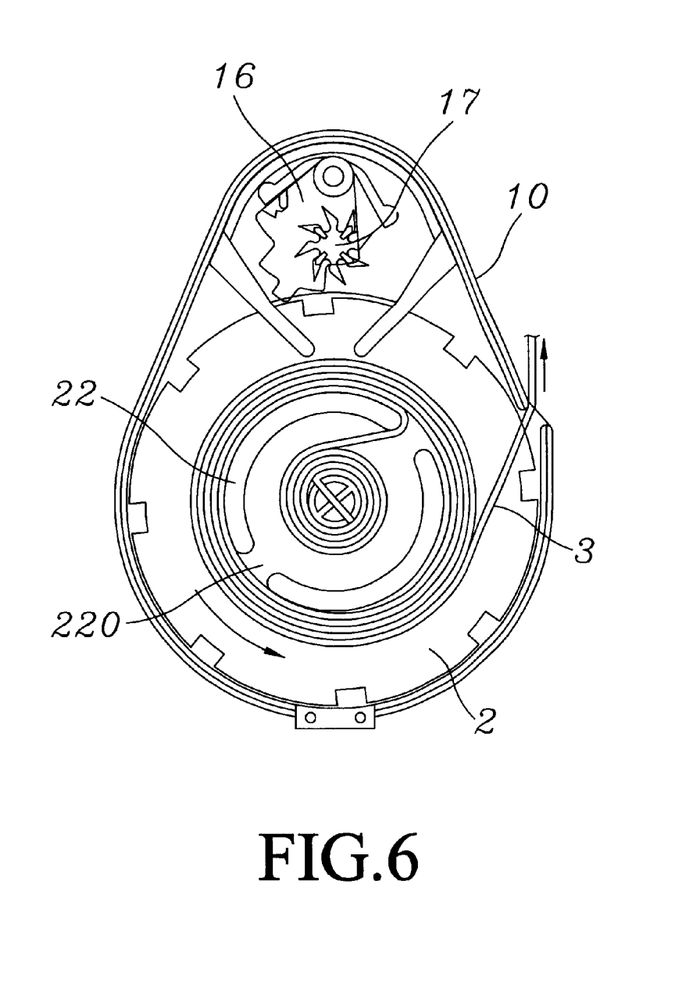
FIG. 6 is a schematic plan view showing the rotary disk of the present invention as the communication wire is pulled out.
Figure 7:
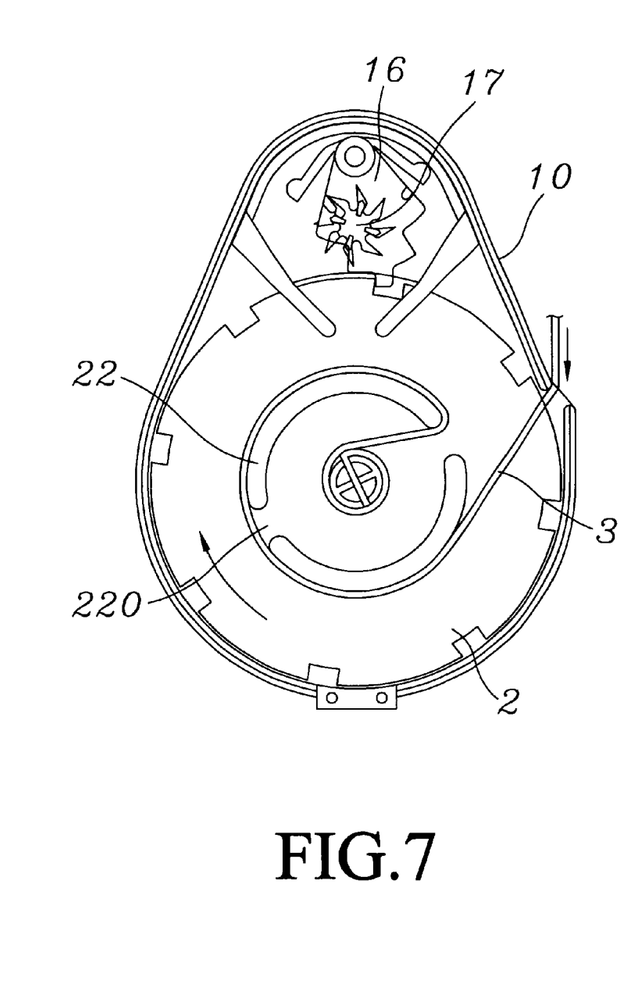
FIG. 7 is a schematic plan view showing the rotary disk of the present invention as the communication wire is rewound.
Figure 8:
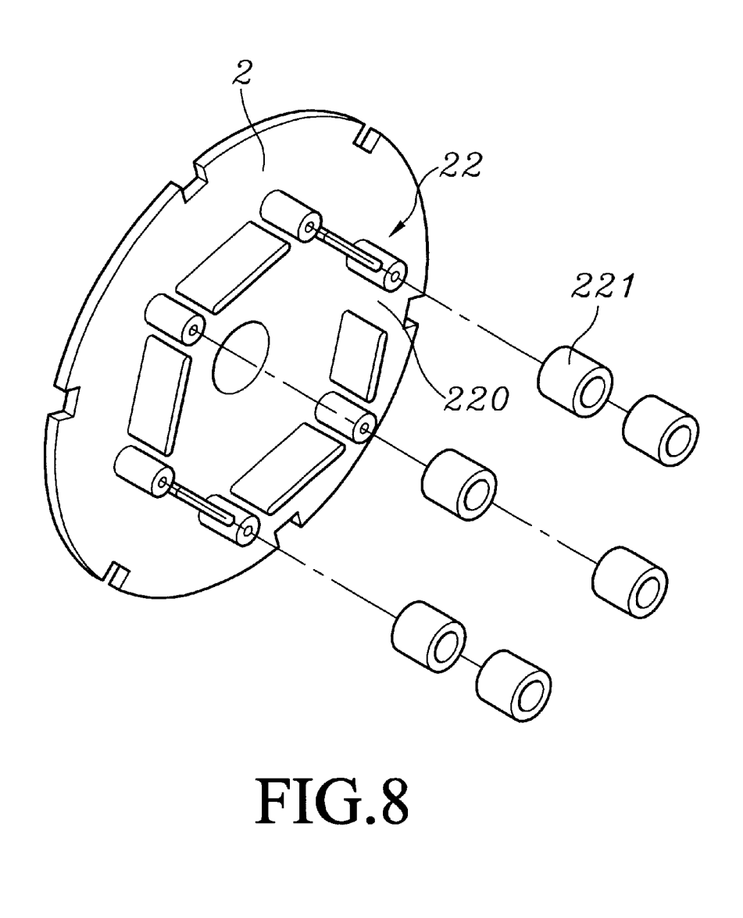
FIG. 8 is an exploded perspective view showing the second ring of the present invention being formed by a plurality of rollers.
Figure 9:
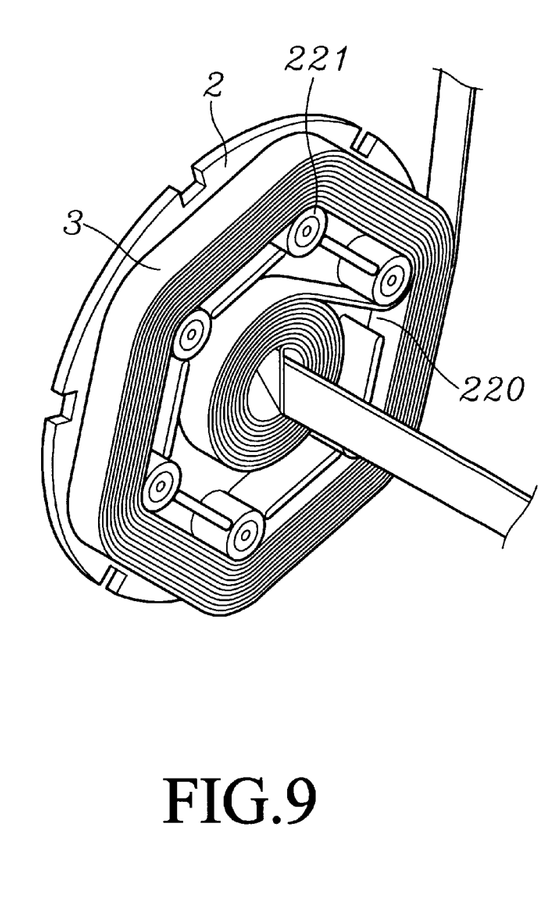
FIG. 9 is a perspective view of the structure of FIG. 8 showing the rotary disk with the communication wire wound thereon.

Therefore, the communication wire 3 passes through the pivotal shaft 13, and then is pulled directly to the second ring 22. As the rotary disk 2 rotates, a synchronous winding is generated. As the wire is rewound due to the action of the spiral spring 4, the communication wire 3 will wind on the pivotal shaft 3 and the second ring 22 at the same time. As the communication wire 3 is pulled out, as shown in FIG. 6, the outer section of the communication wire 3 is pulled away from the second ring 22 with a larger diameter, and at the same time the inner section of communication wire 3 will rotate synchronously so as to be pulled away from the pivotal shaft 13 with a smaller diameter. As the rotary disk 2 rotates, the lengths of the lines released from the second ring 22 and the pivotal shaft 13 are different, and therefore, the section of the communication wire 3 wound out of the second ring 22 will slide at a proper time so that the communication wire 3 can be pulled out continuously. Alternatively, as the communication wire 3 is released so that it can be rewound, and by the property that the second ring 22 and the pivotal shaft 13 have different diameters, the communication wire 3 can slide on the second ring 22 at a proper time so as to be wound around the pivotal shaft 13 and the second ring 22. Further, in order to increase the sliding of the communication wire 3 on the second ring 22, as shown in FIGS. 8 and 9, the second ring 22 can be formed by a plurality of rollers 221 arranged in a circular pattern for reducing the resistance due to friction.

Figure 4:
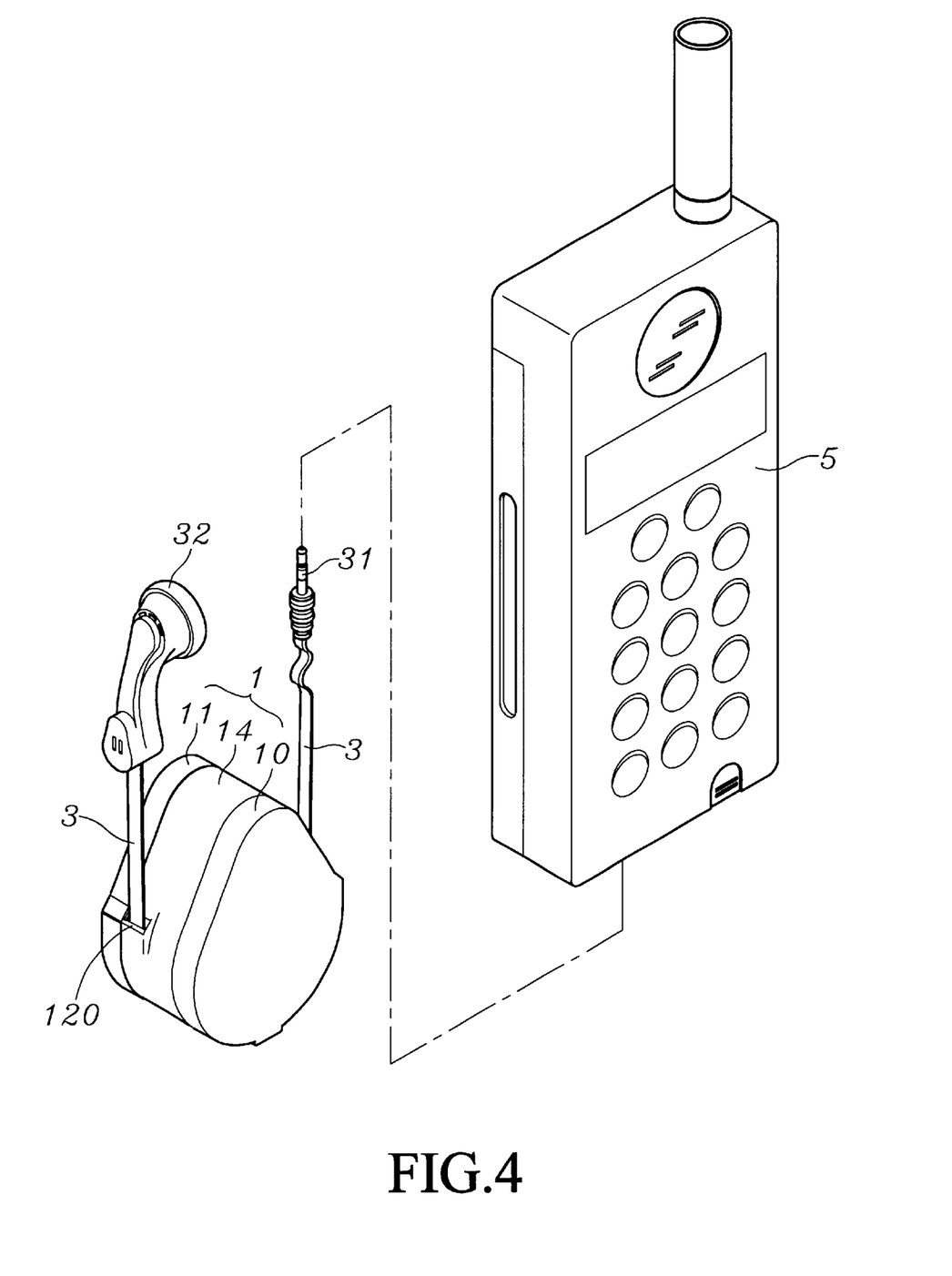
FIG. 4 is a perspective view showing the present invention with two bodies, and two wire ends of a communication wire protruding out from line outlets from different sides of the case.
Figure 5:
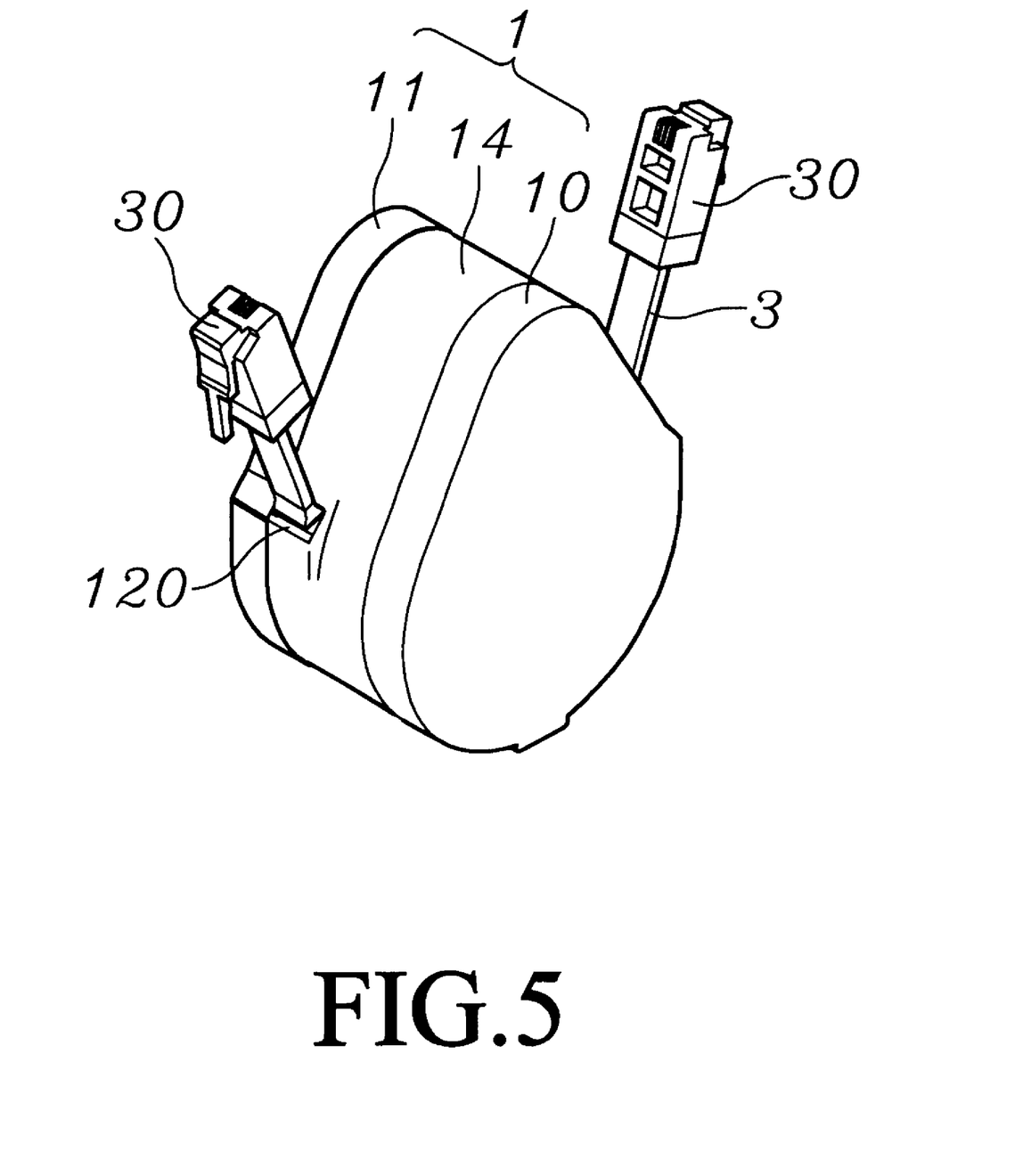
FIG. 5 is a perspective view which is identical to that shown in FIG. 4, while the wire end of the communication wire is assembled with a telephone plug.

When the present invention is to be used, it is only necessary to draw the plug at one end of the communication wire 3, then the communication wire can be pulled to a respective electronic device, such as a mobile phone, a computer, a telephone, a modem, etc., shown in FIG. 4, with a proper tension. Then, by the restoring elasticity of the spiral spring 4, the communication wire 3 will retain a predetermined tension so as to reduce the length of the exposed wire.

It should be appreciated that a swingable piece 16 and a ratchet wheel 17, which are overlapped partially and can swing freely, are pivotally installed in the receiving tank 12 adjacent the rotary disk 2. A plurality of buckling grooves 23 are formed in the periphery of the rotary disk 2. Each swingable piece 16 is installed with an angularly directed elastic piece 160 capable of resisting against the wall of the case and installed at two sides of the pivotal connection of the swingable piece 16. And, a tongue 161 is formed on the swingable piece 16 for obliquely resisting against the periphery of the rotary disk 2 or falling into the buckling groove 23. The ratchet wheel 17 is installed with a plurality of ratchet teeth 170. Every other one of the ratchet teeth is installed with a buckling block 171. Two sides of the swingable piece 16 adjacent to the bottom of the ratchet wheel 17 are installed with a catch 162. By means of the catch, as the swingable piece is swung, a respective ratchet tooth 170 can be pushed and then is engaged into a proper gap. Adjacent the catch 162, an engaging block 163 is installed which can be engaged with the respective buckling block 171.

Figure 10:
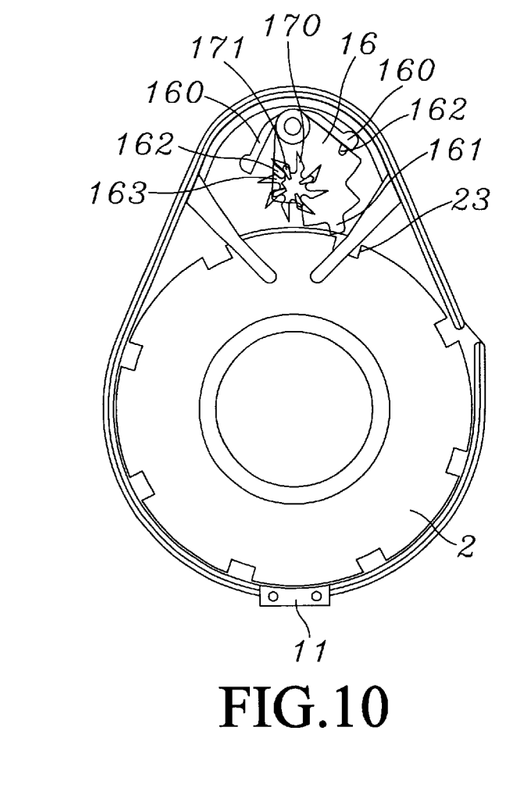
FIG. 10 is a schematic plan view showing, in the initial condition, the relative relationship of the swingable piece and the ratchet wheel.
Figure 11:
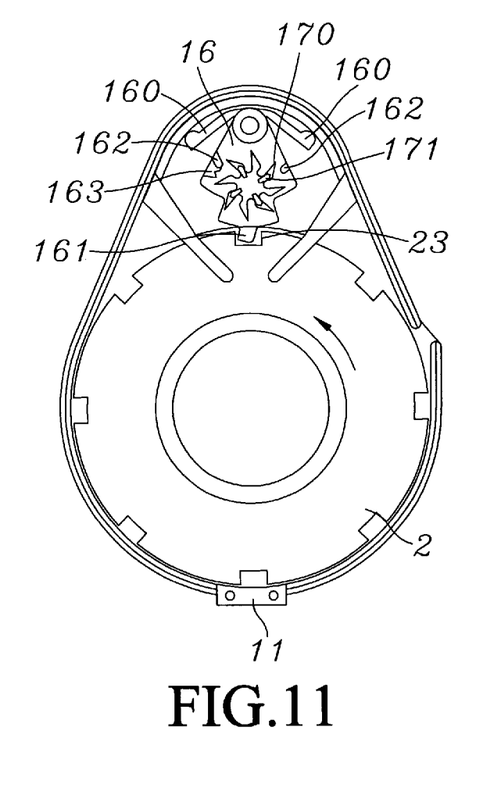
FIG. 11 is a schematic plan view showing, as the communication wire is pulled out, the relative relationship of the swingable piece and the ratchet wheel.
Figure 12:
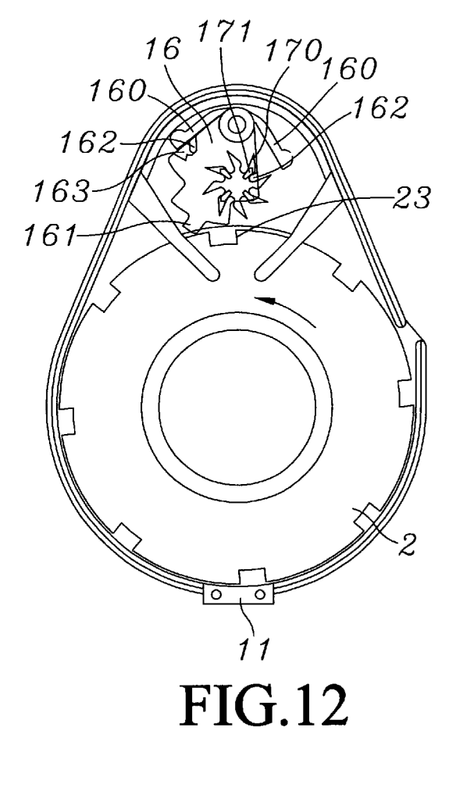
FIG. 12 is a schematic plan view showing, as the communication wire is pulled out continuously, the relative relationship of the swingable piece and the ratchet wheel.
Figure 13:
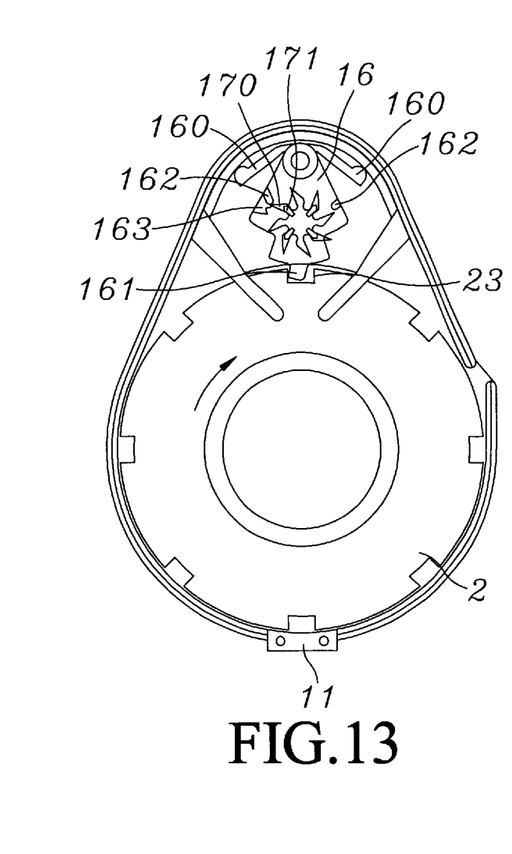
FIG. 13 is a schematic plan view showing, as the communication wire is released and rewound, the relative relationship of the swingable piece and the ratchet wheel.
Figure 14:
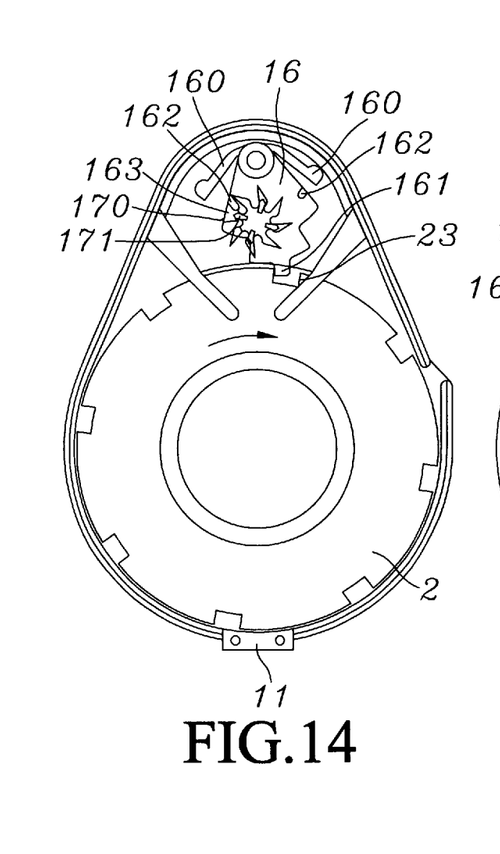
FIG. 14 is a schematic plan view showing, as the communication wire is caught and positioned, the relative relationship of the swingable piece and the ratchet wheel.
Figure 15:
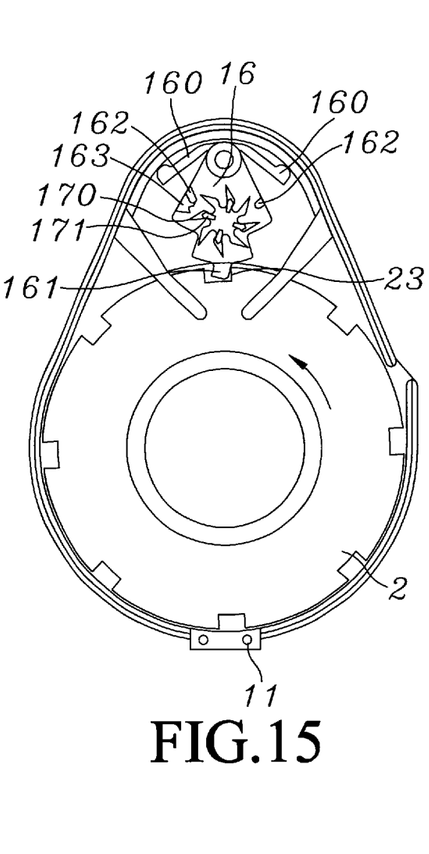
FIG. 15 is a schematic plan view showing, as the communication wire is pulled out again, the relative relationship of the swingable piece and the ratchet wheel.
Figure 16:
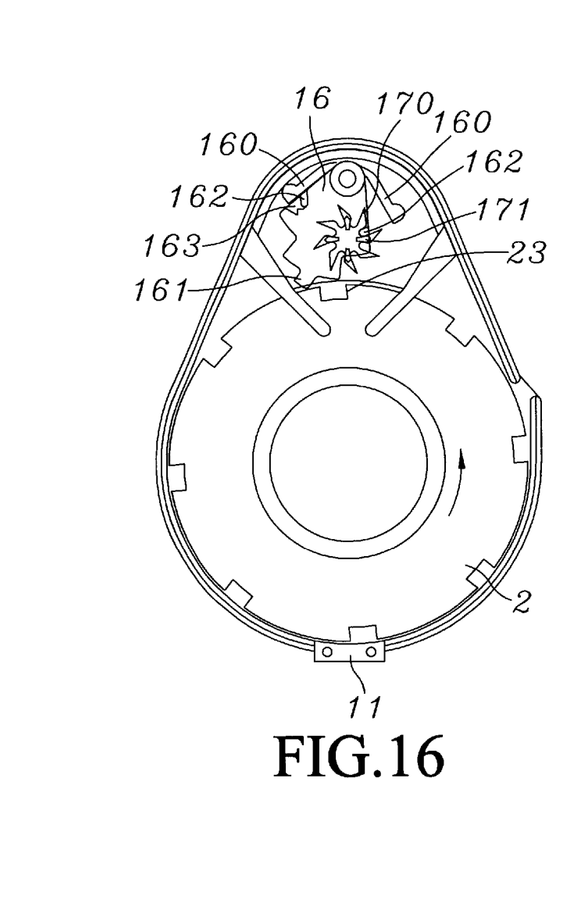
FIG. 16 is a schematic plan view showing, as the communication wire is pulled out continuously again, the relative relationship of the swingable piece and the ratchet wheel.
Figure 17:
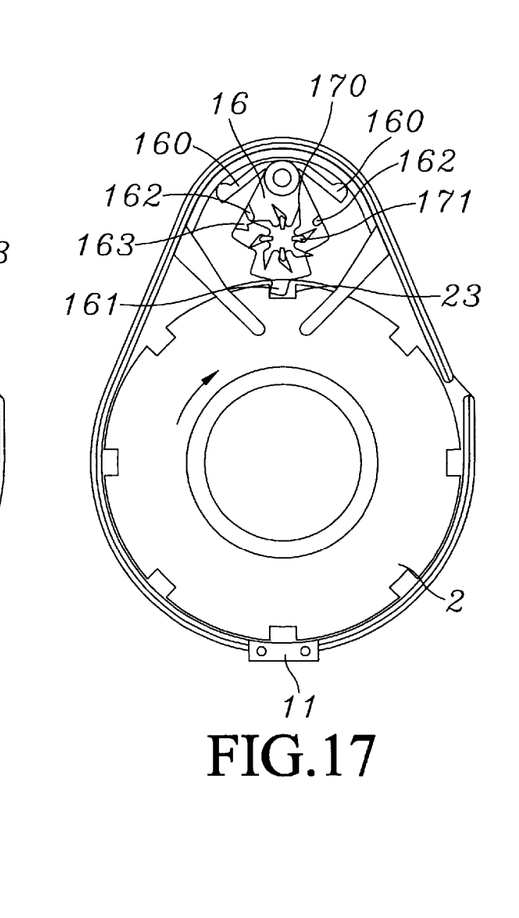
FIG. 17 is a schematic plan view showing, as the communication wire is released and rewound again, the relative relationship of the swingable piece and the ratchet wheel.
Figure 18:
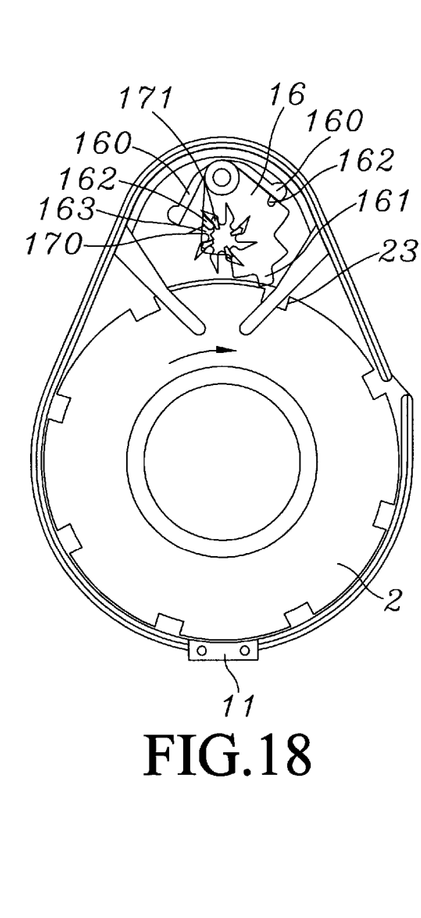
FIG. 18 is a schematic plan view showing, as the communication wire can be rewound continuously, the relative relationship of the swingable piece and the ratchet wheel.

Thereby, as shown in FIG. 10, in the initial condition, the swingable piece 16 swings rightwards, and only the right catch 162 slides into the ratchet teeth 170 at the left side of the ratchet wheel 17. The communication wire 3 is pulled out so that the rotary disk rotates counterclockwise. The right elastic piece 160 will force the tongue 161 to buckle into the buckling groove 23 by the restoring elasticity thereof, so that it will be pushed to cause the swingable piece 16 to swing leftwards, as shown in FIGS. 11 and 12. Then, the right catch 162 will push the left ratchet teeth 170 to move through a half gap and then is engaged and fixed thereat. In this condition, the rotary disk 2 can rotate continuously counterclockwise. Whereas, when the communication wire 3 is released so as to be rewound, as shown in FIGS. 13 and 14, the swingable piece 16 similarly causes the tongue 16 to fall into the buckle groove 23 due to the elastic force of the left elastic piece 160, and then is pushed leftwards by the rotary disk rotating clockwise. Not only will the left catch 162 push the ratchet teeth 170 to move through half gap and then is engaged therein, but also the engaging block 163 will buckle the buckling block 171 of the ratchet wheel 17 so that the swingable piece 16 cannot swing rightwards. Then, the rotary disk 2 is buckled so as not to wind the communication wire 3, to position the communication wire. Thereafter, as the communication wire 3 is pulled out again, as shown in FIGS. 15 and 16, the swingable piece 16 will be pushed leftwards again, to have a relationship with the ratchet wheel 17 that is identical to that shown in FIG. 12. That is, the rotary disk 2 can now rotate freely clockwise so that the communication wire 3 can be pulled out continuously. However, despite the length of the wire pulled out, once it is released, as shown in FIGS. 17 and 18, the swingable piece 16 will swing rightwards to the initial condition shown in FIG. 10, which is different from that shown in FIG. 14 where the swingable piece swings rightwards. Now, only the left catch 162 is pushed and is engaged in the left ratchet teeth 170, but the engaging block 163 does not buckle into the buckling block 171. Thus, the rotary disk 2 can rotate clockwise completely and the communication wire 3 can be wound freely and rapidly.

In summary, as the swingable piece 16 swings leftwards and rightwards once, then, by a respective catch 162, the ratchet wheel 17 rotates through one gap and by the special design that every other one of the ratchet teeth 170 have a buckling block 171, despite the length of the wire having been pulled out, when the user first pulls out the communication wire 3, upon releasing the wire it is positioned. As the wire is pulled out again and then released, the wire can be rewound. Accordingly, through the regular action of alternatively pulling and releasing, the wire can be positioned and rewound, and the user may clearly know the action of the wire. Therefore, the present invention can be used easily and conveniently.

Accordingly, the wire winding box for short distance use disclosed in the present invention substantially simplifies the structure of wire winding boxes and the pulled wire can be positioned effectively.

Although the present invention has been described with reference to the preferred embodiments, it will be understood that the invention is not limited to the details described thereof. Various substitutions and modification shave been suggested in the foregoing description, and others will occur to those of ordinary skill in the art. Therefore, all such substitutions and modifications are intended to be embraced within the scope of the invention as defined in the appended claims.

What is claimed is:

1. A wire winding box for short distance use, comprising:
   a case formed by a first half case, a central seat and a second half case which together form two receiving tanks at two sides of said central seat, said central seat having a pivotal shaft extending therethrough into each of the receiving tanks, said pivotal shaft having a line outlet formed in each of two opposing ends thereof;
   a pair of rotary disks respectively rotatably disposed in the two receiving tanks, each rotary disk having a pivot hole formed therein for pivotal engagement on the pivotal shaft to be rotatable thereon, each rotary disk having a first side with a first ring formed adjacent the pivot hole and a second side with a second ring formed adjacent the pivot hole, the first ring being formed with a hooking slot and the second ring having a slot formed therein;
   a single communication wire passing through the pivot shaft and extending from each of the line outlets thereof, a portion of the wire extending from each line outlet being bent through a predetermined angle and wound around the pivotal shaft and then being passed through the slot of a corresponding one of the second rings of the two rotary disks; and,
   a pair of spiral springs respectively received in the two receiving tanks adjacent respective rotary disks, each of the spiral springs having a hook end connected to the hooking slot of the first ring of respective rotary disk to provide an elastic rotative restoring force to the respective rotary disk.

2. The wire winding box for short distance use as claimed in claim 1, wherein two ends of the communication wire protrude from two line outlets on one side of the case.

3. The wire winding box for short distance use as claimed in claim 1, wherein two ends of the communication wire protrude from two line outlets on different sides of the case.

4. A wire winding box for short distance use, comprising:
   a case having at least one receiving tank with a pivotal shaft therein, each of two opposing ends of the pivotal shaft having a respective line outlet formed therein, said case having a pair of line outlets, one of the line outlets in the case being disposed in alined relationship with a corresponding line outlet at one end of the pivotal shaft;
   at least one rotary disk disposed in the receiving tank and having a pivot hole formed therein and rotatably engaged to the pivotal shaft, the rotary disk having a first side with a first ring formed adjacent the pivot hole and a second side with a second ring formed adjacent the pivot hole, the first ring being formed with a hooking slot and the second ring having a slot formed therein, the second ring of the rotary disk being formed by a plurality of rollers arranged in a circular pattern;
   at least one communication wire, one end of the communication wire passing through the line outlets of the pivotal shaft to pass through a corresponding line outlet of the case, an opposing end of the wire being bent through a predetermined angle to be wound around the pivotal shaft and then pulled through the slot of the second ring, the wire being wound around the second ring and then protruding out of another of the line outlets of the case; and,
   at least one spiral spring disposed in the receiving tank adjacent the rotary disk, the spiral spring having a hook end connected to the hooking slot of the first ring to provide an elastic rotative restoring force to the rotary disk.

5. A wire winding box for short distance use, comprising:

a case having at least one receiving tank with a pivotal shaft therein, each of two opposing ends of the pivotal shaft having a respective line outlet formed therein, said case having a pair of line outlets, one of the line outlets in the case being disposed in alined relationship with a corresponding line outlet at one end of the pivotal shaft;

at least one rotary disk disposed in the receiving tank and having a pivot hole formed therein and rotatably engaged to the pivotal shaft, the rotary disk having a first side with a first ring formed adjacent the pivot hole and a second side with a second ring formed adjacent the pivot hole, the first ring being formed with a hooking slot and the second ring having a slot formed therein, the rotary disk having a plurality of buckling grooves formed in a periphery thereof;

a swingable piece and a ratchet wheel being partially overlapped and pivotally installed in the receiving tank adjacent the rotary disk, the swingable piece having a pair of angularly extending elastic pieces for resisting against a wall of the case respectively installed on two sides of the pivotal connection of the swingable piece, the swingable piece having a tongue formed thereon for obliquely resisting against the periphery of the rotary disk or insertion into the buckling groove, the ratchet wheel being formed with a plurality of ratchet teeth, every other one of the ratchet teeth being formed with a buckling block, the swingable piece having a catch respectively formed at each of two sides thereof adjacent to a bottom of the ratchet wheel, the swingable piece having an engaging block formed adjacent each respective catch, wherein as the swingable piece is swung, a ratchet tooth can be pushed and then engaged into a proper gap, and a respective engaging block is engaged with a respective buckling block;

at least one communication wire, one end of the communication wire passing through the line outlets of the pivotal shaft to pass through a corresponding line outlet of the case, an opposing end of the wire being bent through a predetermined angle to be wound around the pivotal shaft and then pulled through the slot of the second ring, the wire being wound around the second ring and then protruding out of another of the line outlets of the case; and, at least one spiral spring disposed in the receiving tank adjacent the rotary disk, the spiral spring having a hook end connected to the hooking slot of the first ring to provide an elastic rotative restoring force to the rotary disk.

* * * * *